United States Patent
Sherman et al.

[11] Patent Number: 5,682,220
[45] Date of Patent: Oct. 28, 1997

[54] VISION DIRECTING SUNGLASSES

[76] Inventors: Charles J. Sherman, 144 Warkworth, Inverness, Ill. 60067; Robert A. Sherman, 1033 S. Greenwood, Park Ridge, Ill. 60068

[21] Appl. No.: 508,091

[22] Filed: Jul. 27, 1995

[51] Int. Cl.$^6$ .................. G02C 7/16; G02C 7/00
[52] U.S. Cl. .................. 351/45; 351/46; 351/53
[58] Field of Search .................. 351/45, 46, 44, 351/41, 47, 57, 158, 53, 49

[56] References Cited

U.S. PATENT DOCUMENTS

| | | |
|---|---|---|
| 1,067,793 | 7/1913 | Barr . |
| 1,180,341 | 4/1916 | Thomas . |
| 1,257,667 | 2/1918 | Barr . |
| 1,480,821 | 1/1924 | Henry . |
| 1,510,850 | 10/1924 | Jacobs et al. . |
| 1,568,900 | 1/1926 | Metcalf . |
| 1,637,406 | 8/1927 | Brumder . |
| 1,643,509 | 9/1927 | Moran . |
| 1,683,505 | 9/1928 | Walker . |
| 1,706,429 | 3/1929 | Willard . |
| 2,009,700 | 7/1935 | McMurdo . |
| 2,045,399 | 6/1936 | McMurdo . |
| 2,076,432 | 4/1937 | Kinney . |
| 2,409,356 | 10/1946 | Hutchings . |
| 3,228,696 | 1/1966 | Hull . |
| 3,264,002 | 8/1966 | Palumbo . |
| 3,268,228 | 8/1966 | Novack . |
| 3,487,549 | 1/1970 | Engesser . |
| 3,555,563 | 1/1971 | Grossman . |
| 3,729,199 | 4/1973 | Granberg . |
| 3,819,189 | 6/1974 | Goode . |
| 3,871,104 | 3/1975 | Underhill, II . |
| 4,022,475 | 5/1977 | Todd . |
| 4,168,111 | 9/1979 | Baines . |
| 4,251,076 | 2/1981 | Krupicka . |
| 4,531,743 | 7/1985 | Lott . |
| 4,762,325 | 8/1988 | McCleery . |
| 4,824,234 | 4/1989 | Sparks et al. . |
| 4,991,849 | 2/1991 | Fabanich . |
| 5,171,152 | 12/1992 | McCleery . |
| 5,177,510 | 1/1993 | Peters et al. . |
| 5,189,445 | 2/1993 | Stagner . |
| 5,252,997 | 10/1993 | Christenbery . |

FOREIGN PATENT DOCUMENTS

WO 91/07215  5/1991  WIPO .

*Primary Examiner*—Hung X. Dang
*Attorney, Agent, or Firm*—Steven P. Shurtz; Brinks Hofer Gilson & Lione

[57] ABSTRACT

Sunglasses with vision directing sections comprise a frame with temples to hold the frame on the wearer's face and lenses in the frame. Each lens is tinted on its front and rear surfaces and one of those surfaces is further coated with a reflecting layer except in the area of the vision directing section. The sunglasses provide highlighted vision through the vision directing sections so that the wearer's vision is directed to that portion of their field of vision. The sunglasses are useful in a variety of activities where it is beneficial to direct attention to a select portion of a person's field of vision or where it is desirable to have a less shaded view through the sunglasses.

17 Claims, 1 Drawing Sheet

VISION DIRECTING SUNGLASSES

BACKGROUND OF THE INVENTION

The present invention relates to sunglasses, and particularly to sunglasses with a vision directing section.

There are many times when a person desires to wear sunglasses. Many outdoor activities are easier to accomplish when the eyes are shaded from bright sunlight. However, at times a person wearing sunglasses will be benefitted if a portion of the field of vision is highlighted.

For example, a person playing golf is supposed to keep his or her head down and eyes on the ball while swinging. Numerous patents have disclosed eyeglasses designed to help a person do that. U.S. Pat. No. 1,637,406 discloses a pair of glasses which have a transparent portion and a darkened portion arranged so as to compel the wearer to look straight at the ball. Other patents directed to glasses designed to aid a golfer include U.S. Pat. Nos. 1,683,505; 2,009,700; 2,045,399; 3,228,696; 3,264,002; 3,268,228; 3,487,549; 3,555,563; 3,729,199; 3,819,189; 4,022,475; 4,168,111; 4,251,076; 4,531,743; 4,762,325; 4,824,234; 4,991,849; 5,171,152 and 5,177,510 and PCT Patent Publication No. WO91/07215. With this myriad of patented ideas, one would think numerous designs of glasses for aiding golfers would be readily available.

However, none of these have met with commercial success to the extent that they are readily available at the present time.

Another area where there have been many patented ideas but little commercial success has been specialized glasses for driving an automobile. In this regard, see U.S. Pat. Nos. 1,067,793; 1,510,850; 1,643,509; 1,706,429; 2,076,432 and 5,252,997.

Other patents disclose glasses designed for still additional specialized functions, such as for viewing moving pictures, U.S. Pat. No. 1,180,341; opera glass supports, U.S. Pat. No. 1,480,821; construction alignment, U.S. Pat. No. 3,871,104 and reading, U.S. Pat. No. 5,189,445.

Then of course there are patents directed to improvements in eye shades or sunglasses themselves, such as U.S. Pat. Nos. 1,257,667; 1,568,900 and 2,409,356.

While many of these patented devices have differential light blockage over a portion of the lens, common, readily available sunglasses are limited to those with a uniform darkened lens or those that are vignetted, dark at the top of the lens, light at the bottom, and gradual changes in darkness going from top to bottom. No commercially successful sunglasses known today have a localized vision directing region.

There are probably a number of reasons why the patented glasses noted above have not been commercially successful. Many are complicated and therefore costly to produce. Others are so specialized that demand for them would be low. Even those that are not specialized may not be designed so that they will perform their intended function for a wide variety of individuals, since the placement of features in the glasses would have to be custom fit for each wearer. Therefore the products would not be commercially producible at low cost, mass production rates. Further, most of the products depicted have only one practical use. For example, they would only be worn when golfing. This further limits the demand, because only frequent golfers would find them useful enough to justify their cost.

Hence, there is a need for a simple, inexpensive, easy to produce, pair of sunglasses that can be used for multiple purposes where a vision directing effect is desired.

SUMMARY OF THE INVENTION

A pair of sunglasses has been invented which meets the foregoing needs. In one aspect the invention is a pair of sunglasses with a vision directing section comprising a frame member for holding a pair of sunglass lenses; a pair of temple members connected to the frame member to position the sunglasses on a wearer's face; and a pair of lenses in the frames, each lens being tinted over the entire front and rear surface and having a reflecting layer applied to the entire area of the front or the rear surface except for a vision directing section.

In a second aspect, the invention is a method of directing a person's vision toward a particular portion of the person's field of vision during an activity comprising the steps of providing a pair of sunglasses with a vision directing section comprising a frame member for holding a pair of sunglass lenses; a pair of temple members connected to the frame member to position the sunglasses on the person's face; and a pair of lenses in the frames, each lens being tinted over the entire front and rear surface and having a reflecting layer applied to the entire area of the front or the rear surface except for a vision directing section; and placing the sunglasses adjacent the person's eyes during the activity such that the vision directing section of the lenses is in the portion of the person's field of vision to which vision is to be directed.

In a preferred embodiment, the sunglasses are made from common, readily available materials by well known processes easily adapted to making sunglasses of the present invention, thus making the sunglasses relatively inexpensive. More importantly, the sunglasses of the present invention can be worn anytime a person would normally wear sunglasses, and the vision direction portion has multiple uses. These and other advantages of the invention, as well as the invention itself, will be best understood in light of the attached drawing, a brief description of which follows.

DETAILED DESCRIPTION OF THE DRAWINGS AND PRESENTLY PREFERRED EMBODIMENTS

Figure 1:
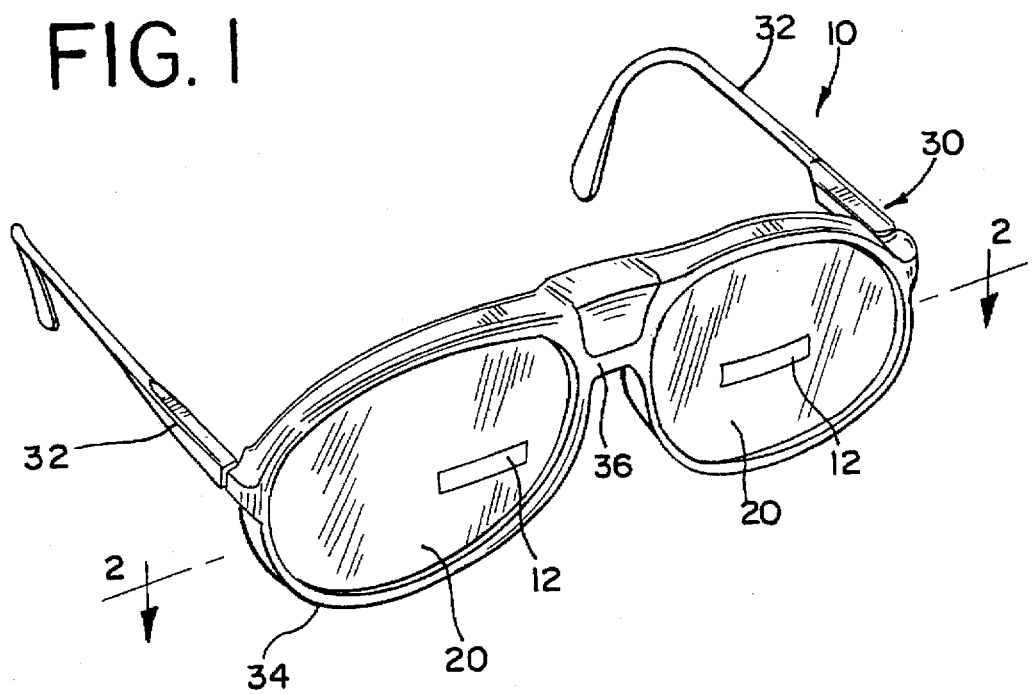
FIG. 1 is a perspective view of a pair of sunglasses according to the present invention.
Figure 2:
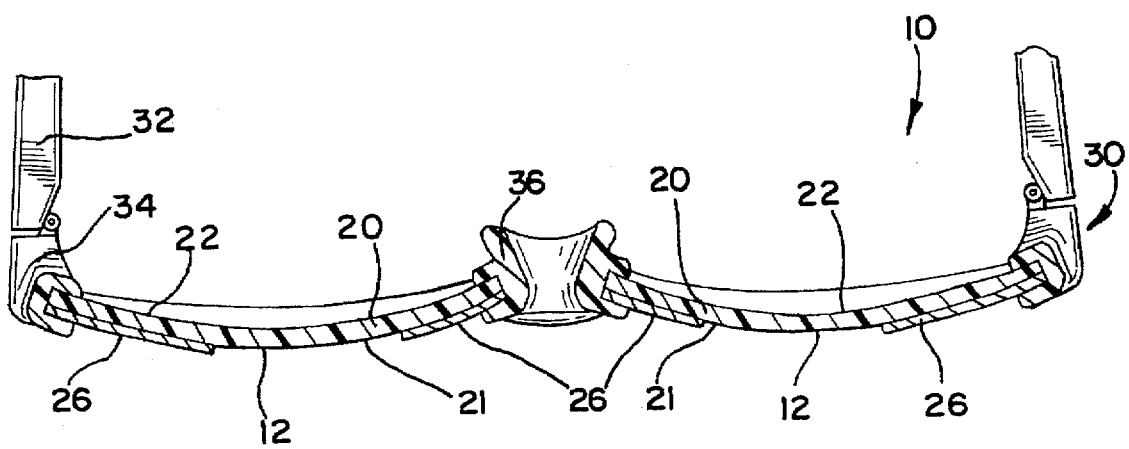
FIG. 2 is a cross-sectional view taken along line 2—2 of FIG. 1.

A preferred embodiment of the sunglasses 10 of the present invention is shown in FIGS. 1 and 2.

The sunglasses 10 include a vision directing section 12 in each of the lenses 20. The vision directing section directs a wearer's vision toward a particular portion of the wearer's field of vision, as described in more detail below.

The glasses 10 can be of a convention design, with two lens members 20 mounted in a frame member 30. The frames can be of any design, but usually include rims 34 to hold the lenses 20, temple members 32 to position the frame member 30 on the wearer's face, and a nose piece 36 to bridge the wearer's nose and support the frames on the wearer's face. The frame member 30 is typically hinged at the temples 32.

The lens members 20 can be either plano or corrective. In either event, the lenses are tinted and have a reflecting layer 26 applied to one surface, preferably covering the entire front surface of each lens member 20 except the vision directing section 12. The tinting will generally cover both the front 21 and rear surface 22 of each lens member 20.

If the lenses are made of plastic, such as ophthalmic plastic CR39 or polycarbonate, the tinting is preferably supplied as a dye that is used to coat the lens and impregnate the first few microns of the surface layers of the plastic. If the lenses are glass, the tinting is preferably applied to both surfaces by using a tinted glass to make the lens. Of course, it is also possible to tint plastic lenses by mixing a pigment into the plastic from which the lens is made, and it is possible to provide a coating on the surfaces of glass lenses to tint them. All such tinting processes are well known.

The reflecting layer 26 is preferably applied by masking the front surface 21 of the lens member 20 to cover the vision directing section 12 and then flash coating the front surface 21. Flash coating to form reflecting layers generally use a metal, mirror coating applied by vacuum depositing techniques which are also well known.

The color of the tinting and reflective layer is not critical, and numerous colors are available. A grey tint is widely used. Preferably the tinting will absorb about 25% to about 50% of the light incident on the lenses 20, and the reflecting layer will preferably reflect about 30% to about 40% of the light incident on the lenses. In this regard, most of the light will be blocked over most of the lens region. Also, even in the vision directing sections 12 there will be a reduced light level, although the area seen through the vision directing sections 12 will appear to be highlighted for the wearer's vision.

The size, shape and position of the vision directing section 12 formed on the lenses is based on several considerations. However, to mass produce sunglasses of the present invention, these items have to be coordinated to provide sunglasses which can fit a large number of people and preferably can be used by each person for several activities.

It has been found that if the vision directing section is formed in a rectangular shape, oriented as shown in FIG. 1, a standard lens can be used by individuals with different eye spacing distances. For example, when the sunglasses 10 are used for golfing, the wearer will want to be able to see the golf ball in the vision directing section 12 of the lenses 20 when the wearer is looking downward and straight out the front of the glasses (which means the wearer's head will be straight and down in the proper position to swing at a golf ball). In that regard, a small circular or square area would be best, so that only the ball could be seen through the vision directing section. However, because different individuals have different spacing between their eyes, the location of the vision directing section on the lens would have to be custom fit for each wearer. By using a rather elongated rectangular vision directing section 12, people with different eye spacings would all be able to use the same lens. Some people, with wide eye spacing, will see the ball through the outer portions of the vision directing section 12, while those who's eyes are closer together will see the ball through the inner portions of the vision directing area 12. Preferably the two vision directing sections 12 on each lens 20 will be centered about 64 mm apart, which is an average pupil distance. Preferably the sections 12 will have a width of about 22 to about 32 mm, more preferably about 25 to about 29 mm and most preferably about 27 mm. With a center-to-center spacing between the vision directing sections 12 on the lenses 20 of 64 mm, a 27 mm wide vision directing section 12 will accommodate individuals with a pupil distance of about 52 to about 76 mm and still leave about a 15 mm margin.

The height of the vision directing section 12 will generally be between about 3 mm and about 7 mm, and preferably about 5 mm. This gives the vision directing area 12 sufficient height so that the wearer is able to see a golf ball or other important items through the vision direction section 12, but not so wide as to encompass too much area.

Preferably the top of the vision directing section 12 is about 3 mm below the optical center of the lens 20 so that the wearer's straight ahead vision will not be through the vision directing section 12. Instead, only when the individual looks downwardly a little will that individual's line of sight be through the vision directing sections 12. Hence, the sunglasses can be worn for normal shaded vision, and the vision direction sections 12 used only when desired. Just as common bifocals give a normal correction for normal distance viewing through the center of the lens and a different corrective power when reading or looking at items through the lower portion of the lens, with the preferred embodiment of the present invention a person will have highly shaded vision while looking through the center of the lens, and less shaded viewing when looking through the vision directing sections 12.

In order to make lenses of the present invention on a mass production basis, and still achieve the proper up and down positioning of the vision directing section 12 in relation to the wearer's eyes, it is contemplated that plano lenses can be mounted in different sizes of frames. An individual will then select a frame size that will result in the top of the vision direction section 12 being about 3 mm below the point at which the person's horizontal vision line intersects the lens. As used herein, the horizontal vision line is the line of horizontal sight of a person when they have their head straight up. Of course, if corrective lenses are to be used in the invention, the optometrist will designate the optical center of the lens blank and the vision directing sections 12 can be applied accordingly.

Of course, the frame members could be wire frames or rimless, and the two lenses could be formed of one continuous member, such as disclosed in U.S. Pat. No. 4,824,234. The nose piece may be formed as part of the frames, as shown, or be separate nose pads attached to the rims.

While it is preferred to put the reflecting layer on the front 21 of the lens 20, because it is easier to mask the convex front surface, the vision directing section 12 could alternatively be formed in a reflecting layer on the back surface 22 of the lens member 20.

The sunglasses of the present invention may be used in several unique ways, whenever it is desirable to direct a person's vision to a particular portion of the person's field of vision during an activity. By placing the sunglasses on the wearer's face, the lenses 20 of the sunglasses will be adjacent the person's eyes during the activity, and the vision directing sections 12 of the lenses will then direct the person's vision to that portion of their field of vision which intersects the vision directing sections 12 of the lenses 20.

As mentioned above, the sunglasses of the present invention can be used during golfing. When the wearer is teeing off a golf ball and the golf ball is seen through the vision directing sections 12 of the lenses 20, the wearer's head will be correctly positioned for the golf swing striking the golf ball. The wearer will first want to get his or her head in the correct position, which will occur as the head is moved so that the golf ball can be seen through the vision directing section. Then through the swing, the vision directing section will help the wearer keep his or her eyes focused on the golf ball.

Another unique use of the sunglasses of the present invention is wearing the sunglasses while driving an automobile. While seated in the driver's seat behind a windshield and dashboard of an automobile, a wearer of the sunglasses will be able to have his or her eyes shaded while sitting erect and looking straight ahead such that the person's horizontal vision line intersects the windshield. However, the dashboard and the instruments thereon, particularly the speedometer, will be visible through the vision directing section of the sunglasses. Since this portion of the person's field of vision will not be as shaded as the portion looking straight ahead, the instruments will be more easily visible. This lessens the amount of adjusting the eyes have to go through between looking out the windshield into bright daylight and looking at the instruments in the relatively darker automobile interior.

In a similar fashion, the sunglasses of the present invention can be used while flying an airplane, and particularly while training to fly on instruments. As the wearer is seated in the cockpit of the airplane behind the windshield and instrument panel, the instruments will be seen through the vision directing sections when the wearer is sitting erect and the horizontal vision line of the wearer intersects the windshield. While training to fly on instruments, the wearer's eyes will be directed to the instruments, rather than to the windshield, which will be in the more shaded field of vision.

One additional unique advantage of the present invention has been discovered when wearing the sunglasses of the present invention during routine activities throughout the day. It is common for people wearing sunglasses while outdoors in bright sunlight to have to remove their sunglasses when they enter a building, such as a store. If a person needs corrective lenses, and has corrective lens sunglasses, they will need to also carry their regular glasses with them throughout the day, switching glasses and sunglasses as they leave and enter buildings. However, with the sunglasses of the present invention, it has been discovered that a wearer can enter a building and leave the sunglasses on. As they need to look at something particular inside the building, such as reading a label on a package at the store, the person adjusts the package or his head such that the image to be read may be seen through the vision directing section of the lenses. With the ability to read through a portion of the sunglasses while indoors, it will generally not be necessary for the person to carry their regular glasses with them throughout the day in order to engage in their normal activities.

The advantage of differential shading is also beneficial for outdoor activities. A person who is reading a book or embroidering outdoors in the sunlight will find the sunglasses of the preferred embodiment of the invention useful to looking at their book or handwork through the vision directing sections. The major portion of the lenses will shade the eyes from bright sunlight, however, the person will be able to still read and see their work through a less shaded portion of the lens.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

I claim:

1. A pair of sunglasses with a vision directing section comprising:

a) a frame member for holding a pair of sunglass lenses;

b) a pair of temple members connected to said frame member to position said sunglasses on a wearer's face; and c) a pair of lenses in said frames, each having a from and rear surface, each lens being tinted over the entire front and rear surface and having a reflecting layer applied to the entire area of the front or the rear surface except for a vision directing section which is generally rectangular in shape and has a height of about 3–7 mm and a width of about 22–32 mm.

2. The sunglasses of claim 1 wherein the vision directing section is positioned on the lenses so as to be below the horizontal vision line of the wearer.

3. The sunglasses of claim 1 wherein the lenses are plastic and the tinting comprises a dye and the reflecting layer comprises a vacuum deposited mirror coating.

4. The sunglasses of claim 1 wherein the tinting absorbs about 25%–50% of any light incident on the lenses and the reflecting layer reflects about 30%–40% of any light incident on the lenses.

5. The sunglasses of claim 1 wherein the lenses are glass and the tinting comprises colored glass.

6. The sunglasses of claim 1 wherein the vision direction sections are each located on its respective lens so that the top of the vision directing section is about 3 mm below the optical center of the lens.

7. The sunglasses of claim 1 wherein the lenses are plano lenses.

8. The sunglasses of claim 1 wherein the lenses are corrective.

9. The sunglasses of claim 1 wherein the reflective layer, is on the front surface of the lens.

10. The sunglasses of claim 1 wherein the vision directing section is rectangular in shape with a height of about 5 mm and a width of about 27 mm.

11. The sunglasses of claim 1 wherein the vision directing sections on the two lenses are centered about 64 mm apart.

12. A method of directing a person's vision toward a particular portion of the person's field of vision during an activity comprising the steps of:

a) providing a pair of sunglasses with a vision directing section comprising:

i) a frame member for holding a pair of sunglass lenses;

ii) a pair of temple members connected to said frame member to position said sunglasses on the person's face; and iii) a pair of lenses in said frames, each having a front and rear surface, each lens being tinted over the entire front and rear surface and having a reflecting layer applied to the entire area of the front or the rear surface except for a vision directing section which is generally rectangular in shape and has a height of about 3–7 mm and a width of about 22–32 mm; and b) placing the sunglasses adjacent the person's eyes during said activity such that the vision directing sections of the lenses are in the portion of the person's field of vision to which vision is to be directed.

13. The method of claim 12 wherein said activity comprises teeing off a golf ball and the golf ball is seen through the vision directing sections of the lenses when the person's head is correctly positioned for the golf swing striking the golf ball.

14. The method of claim 12 wherein the activity is driving an automobile while seated behind a windshield and dashboard with instruments on the dashboard, and the instruments are seen through the vision directing sections of the lenses when the person is sitting erect and the horizontal vision line of the person intersects the windshield.

15. The method of claim 12 wherein the activity is reading indoors following having been outdoors in bright sunlight and the person places his head such that the image to be read may be seen through the vision directing sections of the lenses.

16. The method of claim 12 wherein the activity is training to fly an airplane on instruments and the person is seated in a cockpit of an airplane behind an instrument panel and a windshield and instruments on the instrument panel are seen through the vision directing sections of the lenses when the person is sitting erect and the horizontal vision line of the person intersects the windshield.

17. A pair of sunglasses with a vision direction section comprising:

a) a frame member for holding a pair of sunglasses lens;

b) a pair of temple members connected to said frame member to position said sunglasses on a wearer's face; and c) a pair of plastic lenses in said frames, each lens having a front and rear surface, each lens being tinted by a dye over the entire front and rear surface and having a vacuum deposited mirror coating reflecting layer applied to the entire area of the front surface except for a vision directing section positioned on the lenses so as to be below the horizontal vision line of the wearer, the vision directing section being generally rectangular in shape and having a height of about 3–7 mm and a width of about 22–32 mm, with the vision directing sections on the two lenses being centered about 64 mm apart.

* * * * *